US006203930B1

(12) United States Patent
Ichikawa

(10) Patent No.: US 6,203,930 B1
(45) Date of Patent: Mar. 20, 2001

(54) RUST PREVENTIVE COATING AND METHOD FOR FORMING THE SAME

(75) Inventor: Yoshio Ichikawa, Kanagawa (JP)

(73) Assignee: Kabushiki Kaisha Nippankenkyusho, Kanagawa (JP)

( * ) Notice: Subject to any disclaimer, the term of this patent is extended or adjusted under 35 U.S.C. 154(b) by 0 days.

(21) Appl. No.: 09/120,348

(22) Filed: Jul. 21, 1998

(51) Int. Cl.[7] .......... C08K 3/10
(52) U.S. Cl. .......... 428/655; 427/372.2
(58) Field of Search .......... 428/655; 427/372.2

(56) References Cited

U.S. PATENT DOCUMENTS

| | | | | |
|---|---|---|---|---|
| 4,533,683 | * | 8/1985 | Murakami et al. | 523/414 |
| 5,258,079 | * | 11/1993 | Nakatsukasa et al. | 148/262 |
| 5,393,605 | * | 2/1995 | Miyoshi et al. | 428/327 |
| 5,795,660 | * | 8/1998 | Yoshimi et al. | 428/626 |
| 5,993,975 | * | 11/1999 | Tanaka et al. | 428/458 |

* cited by examiner

*Primary Examiner*—Francis J. Lorin
(74) *Attorney, Agent, or Firm*—Burgess, Ryan & Wayne; Milton J. Wayne; William R. Moran

(57) ABSTRACT

(1) An undercoat layer is formed on a surface of a substrate mainly composed of iron by coating the substrate with at least one metal selected from the group consisting of zinc, tin, lead, aluminum, chromium, nickel and copper by hot dipping, electroplating, penetration plating, thermal spraying or chemical plating, or a paint containing at least one rust preventive pigment selected from the group consisting of zinc dust, zinc chromate, minium, basic lead chromate, strontium chromate and lead chromate, and then, (2) the undercoat layer is coated with a paint composition mainly composed of (a) 100 parts by weight of an inorganic filler, (b) 5 to 30 parts by weight of a binder in terms of solid content, and (c) 10 to 100 parts by weight of water and/or a hydrophilic organic solvent, and the composition is hardened by drying at ordinary temperature or heat drying at low temperature to form an overcoat layer, thereby obtaining a rust preventive coating good in hydrophilic properties, air permeability and drying properties, and excellent in corrosion resistance.

8 Claims, No Drawings

RUST PREVENTIVE COATING AND METHOD FOR FORMING THE SAME

BACKGROUND OF THE INVENTION

The present invention relates to a rust preventive coating and a method for forming the same, and more particularly to a rust preventive coating having hydrophilic properties, air permeability and drying properties, and excellent in corrosion resistance, especially when scratches are developed. The coating is obtained by coating a surface mainly composed of iron with a metal baser or better in corrosion resistance than iron, and then, coating it with a specific paint composition, followed by drying at an ordinary temperature or heat drying at a low temperature.

Conventional rust preventing methods for iron include methods of lowering the electrode potential of iron, methods of coating the surface of iron to prevent the movement of ions, and methods of coating to prevent water and oxygen from passing through to iron, for preventing the anode reaction (formation of $Fe^{2+}$) and the cathode reaction (formation of $OH^-$) occurring on the surface of iron.

Specific examples of such rust preventing methods include coating methods with metals baser or better in corrosion resistance than iron, and coating methods by other coating means. However, in the case of only the former coating with metals, problems are encountered with regard to the durability and corrosion resistance of the metal. In the case of the latter coating with other coating means, problems arise in respect to the coating of edge portions, suppression of the occurrence of pin holes, maintenance of corrosion resistance and durability at the time when scratches are developed, and pursuing excellent processability and low cost.

SUMMARY OF THE INVENTION

It is therefore an object of the present invention to provide a rust preventive coating having hydrophilic properties, air permeability and drying properties, and excellent in corrosion resistance, especially when scratches are developed, and a method for forming the same.

According to the present invention, there are provided a rust preventive coating formed on a surface of a substrate mainly composed of iron, which comprises an undercoat layer of the following (1) and an overcoat layer of the following (2):

(1) the undercoat layer obtained by coating the substrate with at least one metal selected from the group consisting of zinc, tin, lead, aluminum, chromium, nickel and copper by hot dipping, electroplating, penetration plating, thermal spraying or chemical plating, or a paint containing at least one rust preventive pigment selected from the group consisting of zinc dust, zinc chromate, minium, basic lead chromate, strontium chromate and lead chromate (hereinafter referred to as "undercoat paint"); and (2) the overcoat layer obtained by coating the undercoat layer with a paint composition mainly composed of (a) 100 parts by weight of an inorganic filler, (b) 5 to 30 parts by weight of a binder in terms of solid content, and (c) 10 to 100 parts by weight of water and/or a hydrophilic organic solvent, and then, hardening the composition; and a method for forming the above-mentioned coating.

DESCRIPTION OF THE PREFERRED EMBODIMENTS

The rust preventive coating of the present invention is characterized in that the coating is formed of a corrosion-resistant metal layer or a rust preventive pigment-containing coat (undercoat layer) coating a surface of a substrate mainly composed of iron, and a hydrophilic, air-permeable protective coat (overcoat layer) for protecting the undercoat layer.

(1) Undercoat Layer

The undercoat layer is formed on the surface of the substrate mainly composed of iron as a metallic deposit layer having good corrosion resistance or a paint layer containing a rust preventive pigment mainly composed of a metal lower in ionization tendency than iron or a compound thereof.

The substrates mainly composed of iron which are used herein include flat plates, corrugated plates, steel products and bars formed of iron such as pure iron, steel iron or cast iron, and there is no particular limitation on the material and shape thereof.

In the above-mentioned plating, at least one metal selected from the group consisting of zinc, tin, lead, aluminum, chromium, nickel and copper is used, and particularly, zinc, tin or chromium is preferred.

Of the plating methods, the hot dipping is the method of dipping substrate in a bath of a melted metal such as zinc, tin, aluminum or a lead-tin alloy.

The electroplating is the method of electrolytically depositing, in an aqueous solution containing ions of the above-mentioned metal, cations of the metal such as zinc, tin, copper, nickel or chromium contained in the aqueous solution on the surface of substrate used as a cathode.

The penetration plating is the method of forming an alloy with chromium, aluminum or zinc on the surface of substrate by diffusion and penetration of the above-mentioned metal under an elevated temperature.

The thermal spraying is the method of spraying the metal such as zinc, aluminum, tin or lead melted with an arc on the surface of substrate to form a thick coating.

The chemical coating is the method of electrolessly depositing, from an aqueous solution containing ions of the above-mentioned metal, the metal such as nickel, chromium or copper on the surface of substrate with a reducing agent.

Specific examples of the undercoat layers formed by these plating methods include galvanized plates and tin plates.

There is no particular limitation on the thickness of the undercoat layers formed by these plating methods. Usually, however, the deposited amount of zinc is 50 to 300 $g/m^2$ for zinc hot dipping, that of tin is 20 to 30 $g/m^2$ for tin hot dipping, that of zinc is 10 to 55 $g/m^2$ for zinc electroplating, and that of tin is 5 to 20 $g/m^2$ for tin electroplating.

When the undercoat layer is formed with the paint containing the rust preventive pigment, at least one pigment selected from the group consisting of zinc dust, zinc chromate, minium, basic lead chromate, strontium chromate and lead chromate is used as the rust preventive pigment.

The paints include paints containing binders such as synthetic resins, alkoxysilanes and silicates, and rust preventive pigments such as zinc dust, zinc chromate, minium, basic lead chromate, strontium chromate, lead chromate and lead suboxide.

The amount of the rust preventive pigments contained in above-mentioned paints is usually 10 to 90% by weight, and preferably 50 to 85% by weight, in terms of solid content.

Specific examples of the paints containing the rust preventive pigments include Ceramica G1-720Z (manufactured by KABUSHIKI KAISHA NIPPANKENKYUSHO) and Ceramica MSA-800Z (manufactured by KABUSHIKI KAISHA NIPPANKENKYUSHO).

There is no particular limitation on the thickness of the undercoat layers formed of these rust preventive pigment-containing paints. However, the dried film thickness thereof is usually 5 to 400 μm, and preferably 15 to 160 μm.

When the undercoat layers are formed of the above-mentioned rust preventive pigment-containing paints, they are usually hardened at an ordinary temperature for 1 to 24 hours, or at a temperature of 100 to 150° C. for 10 to 60 minutes.

(2) Overcoat Layer

The overcoat layer used in the present invention acts as a protective coat which protects the above-mentioned undercoat layer, has hydrophilic properties and air permeability, is good in drying properties, suitably ionizes the metal or the rust preventive pigment of the undercoat layer, and forms no local electric cell in the substrate. Even if the substrate having the rust preventive coating of the present invention is damaged during or after the formation of the overcoat layer so that an iron portion of the substrate is exposed to the air, the surface of the exposed portion is subsequently converted to triiron tetraoxide ($Fe_3O_4$, black), and thereafter never changed to diiron trioxide ($Fe_2O_3$, red). Thus, a stable state of the substrate can be maintained. This is conceivably because the moisture in atmosphere is always kept in the overcoat layer due to the excellent hydrophilic properties and air permeability of the overcoat layer. In order to exhibit the above-mentioned effect, the overcoat layer used in the present invention is indispensable for obtaining the rust preventive coating excellent in durability.

This overcoat layer is formed by applying the paint composition mainly composed of the above-mentioned components (a) to (c) onto the undercoat layer, and then, drying it at an ordinary temperature or drying it by heating at a low temperature.

(a) Inorganic Filler

The inorganic filler (a) is necessary for forming hydrophilic, air-permeable coat, and further gives coloration and various functions such as thermal insulation, electric conductivity, thermal radiation, wear resistance and antibacterial properties to the coat.

The average particle size or the average length of the inorganic filler (a) is preferably 0.02 to 50 μm, and more preferably 0.2 to 20 μm. An average particle size of less than 0.02 μm results in a failure to obtain a necessary thickness of the coat, a failure to exhibit the desired functions of the inorganic filler, or increased production cost, whereas exceeding 50 μm results in a roughened surface of the coat, or lowered adhesion ability of the coat. Such inorganic fillers (a) are preferably water-insoluble and granular or fibrous, and include at least one selected from the group consisting of inorganic extenders, functional pigments, inorganic pigments and metal powders.

Specific examples of the inorganic fillers include but are not limited to inorganic pigments such as commercial silica, alumina, kaolin, zircon, tin oxide, mullite, Zeolite, talc, magnesium carbonate, magnesium silicate, calcium carbonate, perlite, carbon, potassium titanate whiskers, silicon carbide, silicon nitride, oxides of titanium, iron, manganese, cobalt, chromium and nickel, two-kind synthetic oxides such as oxide of carbon or cobalt and aluminum and oxides of iron and manganese, and three-kind synthetic oxides such as oxides of iron, copper and chromium, and powders of metals such as zinc, nickel, stainless steel, aluminum and tin.

(b) Binder

The binder (b) acts as an adhesive in the paint composition without impairing the hydrophilic properties and air permeability of the coat of the present invention, and is at least one selected from the group consisting of silicates, colloidal silica, colloidal alumina and synthetic resins.

Of these, the silicate has the property that silanol groups (Si—OH) of the silicate are condensed by dehydration to form a three-dimensional structure, and acts as the binder of the coat to be obtained in the paint composition of the present invention.

The silicate is represented by the following structural formula, taking lithium silicate as an example, (Formula 1)

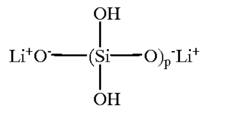

wherein p represents the number of repeating units.

Specific examples of the silicates include, taking anhydrides thereof as examples, lithium silicate, sodium silicate, potassium silicate, cesium silicate and amine silicates.

Of these, the amine silicates include liquid silicates such as dimethylethanolammonium silicate, monomethyltripropanolammonium silicate, dimethyldipropanolammonium silicate and monoethyltripropanolammonium silicate. These amine silicates can be easily obtained by (1) a method of adding quaternary ammonium hydroxides to active silica solutions obtained by bringing diluted water glass in contact with hydrogen type cation exchange resins, and concentrating the resulting solution to a specified concentration, or (2) a method of reacting quaternary ammonium hydroxides with silica hydrosols. The quaternary ammonium hydroxides as used herein are usually obtained by addition of alkylene oxides to ammonium or amines or deionization of quaternary amine salts with anion exchange resins. Quaternary ammonium hydroxides containing primary, secondary or tertiary amines in small amounts can also be used, and amine silicates obtained by use of them can also be used in the compositions of the present invention.

It is preferred that the amine silicates contain $SiO_2$ in an amount ranging from 5 to 70% by weight.

Specific examples of the above-mentioned amine silicates include Amine Silicate Qas 25 [$SiO_2$ content=25–26% by weight, specific gravity (20° C.)=1.19, viscosity (cps)=3.0, pH=11.0] manufactured by Nissan Chemical Industries, Ltd., Amine Silicate Qas 40 [$SiO_2$ content=40–41% by weight, specific gravity (20° C.)=1.32, viscosity (cps)=10.0, pH=11.2] manufactured by Nissan Chemical Industries, Ltd. and NS-20 ($SiO_2$ content=about 20% by weight) manufactured by KABUSHIKI KAISHA NIPPANKENKYUSHO. These silicates may be used alone or in combination.

Of the above-mentioned binders (b), colloidal silica is a siloxane bond-containing polymeric silica sol having silanol groups on the surfaces of silica sol particles. When this is gelled, the condensation-dehydration reaction of the silanol groups on the surfaces of silica sol particles is induced to form siloxane bond chains, thereby, a network structure of three-dimensional siloxane bonds is formed, and in the meanwhile, polymerization is performed to prepare a pure silica gel. Colloidal silica is used as the binder in the paint composition. The single use of colloidal silica provides only the coat having a thickness of 0.1 to 0.3 μm, which is almost useless. However, the coat having a thickness of 5 to 400 μm can be obtained by using a combination of colloidal silica and the inorganic filler (a).

Specific examples of colloidal silica include a Snowtex series manufactured by Nissan Chemical Industries, Ltd., a Cataloid series manufactured by Shokubai Kasei Co., Ltd., and an Adelite series manufactured by Asahi Denka Kogyo K. K.

Colloidal alumina is an alumina sol having a pH of 2.5 to 6 in which water and/or a lower alcohol is used as a dispersion medium, and which contains alumina in an amount of 5 to 25% by weight and an acid such as nitric acid, hydrochloric acid or acetic acid as a stabilizer.

As the above-mentioned colloidal alumina, granular or down-like one having an average particle size or an average thickness of 5 to 50 m$\mu$ is preferred.

Of the above-mentioned binders (b), the synthetic resin acts as an adhesive assistant for the coat to be obtained, and as a buffering agent for the inorganic filler (a), thereby preventing cracks and separation of the coat and also improving the impact resistance. Specifically, the synthetic resins include emulsion type and water-soluble type resins such as acrylic resins, vinyl acetate resins, melamine resins, phenol resins, polybutadiene resins, alkyd resins and silicone resins. For example, when the above-mentioned synthetic resin is well mixed with water and/or a hydrophilic organic solvent, and dried, a water-insoluble transparent or translucent coat is formed. In the above-mentioned paint composition, the synthetic resin is used for adhering the inorganic filler (a).

The amount of the above-mentioned binder (b) contained in the paint composition is 5 to 30 parts by weight, and preferably 10 to 25 parts by weight, in terms of solid content, per 100 parts by weight of inorganic filler (a). Less than 5 parts by weight results in weak adhesion, whereas exceeding 30 parts by weight unfavorably results in excessive covering over the component (a), occurrence of cracks and deterioration of hydrophilic properties and air permeability.

(c) Water and/or Hydrophilic Organic Solvent

Water used in the above-mentioned paint composition is a component indispensable for viscosity adjustment and working time control of the composition, and further for dispersion of the inorganic filler. Service water, distilled water or ion-exchanged water can be used as the water of the present invention. Further, the water also involves water contained in the above-mentioned silicates, colloidal silica, colloidal alumina and emulsion type or water-soluble type synthetic resins.

On the other hand, the hydrophilic organic solvent used in the above-mentioned paint composition is a solvent compatible with water, and used as an adjusting agent for the solid concentration and viscosity of the composition, a drying speed adjusting agent or an antifreezing agent.

The above-mentioned hydrophilic organic solvents are alcohols, glycols, esters, ethers and ketones.

The alcohols include aliphatic alcohols each having 1 to 8 carbon atoms such as methanol, ethanol, n-propanol, i-propanol, n-butanol, sec-butanol, t-butanol and methylcarbitol.

The glycols include, for example, ethylene glycol, propylene glycol and diethylene glycol.

The esters include formic acid, acetic acid and propionic acid esters of the above-mentioned alcohols and glycols, specifically methyl formate, ethyl formate, butyl formate, methyl acetate, ethyl acetate, butyl acetate and ethyl propionate.

The ethers include alkyl ethers of the above-mentioned alcohols and glycols, specifically dimethyl ether, diethyl ether, dibutyl ether, methyl ethyl ether, ethyl butyl ether, ethylene glycol monobutyl ether, ethylene glycol acetate monoethyl ether and propylene glycol monoethyl ether.

The ketones include acetone, diethyl ketone and methyl ethyl ketone.

These hydrophilic organic solvents can be used alone or as a mixed solvent of two or more of them. In the present invention, i-propanol, methylcarbitol, methyl ethyl ketone and ethylene glycol are preferably used alone or as a mixed solvent of two or more of them.

The compounding ratio of component (c) in the above-mentioned paint composition is 10 to 100 parts by weight, and preferably 10 to 50 parts by weight, based on 100 parts by weight of the above-mentioned inorganic filler (a). If the compounding ratio of component (c) is less than 10 parts by weight, the viscosity of the paint composition increases too high, resulting in lowered storage stability or deterioration of the dispersibility of components (a) and (b). On the other hand, if the ratio exceeds 100 parts by weight, other components are relatively decreased. Therefore, occasionally, the adhesion ability of the resulting overcoat layer is impaired, or the thickness of the coat becomes too thin to prepare a desired one, although the storage stability is improved.

The paint compositions of the present invention can optionally contain various surfactants, dispersing agents, hardening adjusting agents, organic dyes, pigments and other additives as required, in addition to the above-mentioned components (a) to (c).

The above-mentioned paint composition is prepared by mixing components (a) to (c), if component (c) is not enough, component (c) can be further added in order to adjust the total solid concentration preferably to 15 to 85% by weight, and more preferably to 30 to 75% by weight. In this case, the above-mentioned paint composition can be converted to a uniform stable dispersion by dispersing it in a high-speed agitator, a roll mill, a ball mill or another dispersing device and filtering it.

For coating the above-mentioned undercoat layer with the paint composition, a coating means such as brushing, spraying, dipping, roll coating or printing can be used.

When the surface of the undercoat layer is coated with the above-mentioned paint composition, the composition is applied in an amount of 10 to 300 $g/m^2$, preferably 40 to 200 $g/m^2$, in terms of solid content, per one application. It can also be applied in several applications. Usually, the total amount of the composition coated is 20 to 600 $g/m^2$, and preferably 60 to 300 $g/m^2$, in terms of solid content. The dried film thickness of the coat is usually 5 to 400 $\mu$m, and preferably 20 to 200 $\mu$m.

The above-mentioned coating composition can be applied to overcoating, and then, hardened at an ordinary temperature (5 to 30° C.) for 1 to 5 hours, or easily hardened by heating it at a low temperature (80 to 180° C.) for 2 to 30 minutes, thereby obtaining the coat.

The coat of the overcoat layer thus obtained is mainly composed of the inorganic filler (a) and the binder (b). Accordingly, the overcoat acts as a protective coat which protects the undercoat layer, has hydrophilic properties and air permeability, suitably ionizes the metal or the rust preventive pigment of the undercoat layer, and forms no local electric cell in the substrate. As a result, no rust is developed even if a portion of the substrate fails to be covered with the undercoat layer or an iron portion of the substrate is exposed by a scratch, and the rust preventive coating excellent in durability is obtained.

The rust preventive coating of the present invention comprises the corrosion-resistant metal layer or a rust preventive pigment-containing coat (undercoat layer) coating the surface of iron (substrate), and the hydrophilic, air-permeable protective coat (overcoat layer) for protecting the undercoat layer. Accordingly, the rust preventive coating of the present invention has the following effects:

(1) The protective coat (overcoat layer) is hydrophilic, so that the corrosion-resistant metal or the rust preventive pigment of the undercoat layer can be suitably ionized. Therefore, an edge portion or a damaged portion of the undercoat layer can be completely covered by the protective coat;

(2) The protective coat (overcoat layer) is excellent in drying properties, so that dew condensation does not occur on the surface of the coat and inside of the coat;

(3) The protective coat (overcoat layer) is a uniform hydrophilic air-permeable coat, so that no local potential difference is generated to form no local electric cell, resulting in prevention of rusting;

(4) Different from the conventional coating processing, the protective coat of the present invention is simply processed, and therefore, the cost can be significantly reduced;

(5) The paint composition forming the overcoat layer is aqueous and easily handled, and after coating, it is dried and hardened at an ordinary temperature for 1 to 3 hours, or under heating at 80 to 180° C. for 2 to 30 minutes. It is therefore excellent in workability; and (6) Even if the substrate having the rust preventive coating of the present invention is damaged during or after the formation of the overcoat layer to expose an iron portion of the substrate, the surface of the exposed portion is converted to triiron tetraoxide ($Fe_3O_4$, black), and thereafter not changed to diiron trioxide ($Fe_2O_3$, red). Thus, a stable state can be maintained.

The present invention will be described in more detail with reference to examples, but it is to be understood that the invention is not limited to the following examples without departing the scope of the following claims.

In the examples, parts and percentages are by weight, unless otherwise specified.

TEST NOS. 1 TO 16 (EXAMPLES) AND TEST NOS. 17 TO 23 (COMPARATIVE EXAMPLES)

Preparation of Paint Compositions A to G for Overcoat

Seven kinds of paint compositions A to G shown in Table 1 were prepared. Components (a) to (c) and optionally other additives were placed in a stirring tank, and mildly stirred, followed by stirring at high speed (15,000 rpm) for 30 minutes and filtration through a 50- to 100-mesh filter. Thus, composition A to G were prepared.

Symbols used in Table 1 indicate the following:

(a) Inorganic Filler
(a)-1; Kaolin (average particle size=4–5 μm)
(a)-2; Quartz sand (average particle size=20 μm)
(a)-3; Silicon dioxide (average particle size=2–3 μm)
(a)-4; Aluminum oxide (average particle size=0.7 μm)
(a)-5; Titanium oxide white (average particle size=0.5 μm)
(a)-6; Iron oxide yellow (average particle size=0.5 μm)
(a)-7; Iron-Manganese synthetic oxide black (average particle size=0.5 μm)
(a)-8; Nickel (average particle size=2 μm)
(a)-9; Potassium titanate whiskers (average length=10–20 μm)
(a)-10; Aluminum hydroxide (average particle size=3 μm)
(a)-11; Silver-carrying Zeolite (average particle size=1.5 μm)
(a)-12; Magnesium carbonate (average particle size=1 μm)
(b) Binder
(b)-1; Amine silicate (NS-20 ($SiO_2$ concentration=about 20%) manufactured by KABUSHIKI KAISHA NIPPANKENKYUSHO)
(b)-2; Amine silicate (Qas 25 ($SiO_2$ concentration=about 25%) manufactured by Nissan Chemical Industries, Ltd.)
(b)-3; Lithium silicate (Lithium 75 ($SiO_2$ concentration=about 20%) manufactured by Nissan Chemical Industries, Ltd.)
(b)-4; Colloidal silica (Cataloid SN ($SiO_2$ concentration=about 20%) manufactured by Shokubai Kasei Co., Ltd.)
(b)-5; Ethylene-vinyl acetate copolymer emulsion (EV-15 (non-volatile matter=55%) manufactured by Dainippon Ink & Chemicals, Inc.)
(b)-6; Acrylic-styrene copolymer emulsion (acrylic emulsion) (EC-905 (non-volatile matter=50%) manufactured by Dainippon Ink & Chemicals, Inc.)
(c) Water or Hydrophilic Organic Solvent
(c)-1; Ion-exchanged water
(c)-2; Ethylene glycol
(d) Other Components
(d)-1; Nonionic dispersing agent
(d)-2; Silicon levelling agent
(d)-3; Aluminum orthophosphate

TABLE 1

| Composition | A | B | C* | D | E** | F | G |
|---|---|---|---|---|---|---|---|
| Compounding Formulation (parts) | | | | | | | |
| (a)-1 | 26 | — | — | 25 | — | — | 22 |
| (a)-2 | — | — | 25 | — | — | — | 31 |
| (a)-3 | — | 26 | — | — | 50 | — | — |
| (a)-4 | 18 | — | — | 33 | 9 | — | — |
| (a)-5 | 37 | 43 | — | — | 33 | — | — |
| (a)-6 | — | — | — | 9 | — | — | 32 |
| (a)-7 | 9 | — | 50 | — | 8 | — | — |
| (a)-8 | — | — | — | — | — | 87 | — |
| (a)-9 | — | 5 | 3 | — | — | 3 | 5 |
| (a)-10 | — | 26 | 9 | 33 | — | — | — |
| (a)-11 | — | — | 3 | — | — | — | — |
| (a)-12 | 10 | — | 12 | — | — | 10 | 10 |
| Total | 100 | 100 | 100 | 100 | 100 | 100 | 100 |
| (b)-1 | 62 | — | 66 | — | — | — | — |
| (b)-2 | — | 52 | — | — | — | 30 | — |
| (b)-3 | — | — | — | 41 | — | — | — |
| (b)-4 | — | — | — | — | 50 | — | — |
| (b)-5 | — | — | — | — | 20 | — | — |
| (b)-6 | 7 | 16 | — | 7 | — | 4 | 32 |
| (c)-1 | — | 7 | — | 17 | — | 4 | 27 |
| (c)-2 | 9 | 5 | — | — | — | 9 | — |
| (d)-1 | 1 | — | 1.5 | 1 | 1.5 | — | 0.8 |
| (d)-2 | — | 1.7 | — | — | — | — | — |
| (d)-3 | — | — | — | 0.3 | — | — | — |

*Composition C contains water contained in (b)-1, as component (c).
**Composition E contains water contained in (b)-4 and (b)-5, as component (c).

Preparation of Undercoat Paints

Undercoat paints (zinc dust paint (1), zinc dust paint (2) and zinc chromate paint) were prepared according to the compounding formulations shown in Table 2.

TABLE 2

| | Zinc Dust Paint (1) | Zinc Dust Paint (2) | Zinc Chromate Paint |
|---|---|---|---|
| Compounding Formulations (parts) | | | |
| Amine silicate (Qas 25) | 17 | — | — |
| Chlorinated rubber | — | 4 | — |
| Acrylic resin emulsion (EC-905) | 3 | — | — |
| Methanol | 12 | — | — |
| Zinc dust | 68 | 85 | — |
| Zinc chromate | — | — | 25 |
| Zinc white | — | — | 10 |
| Linseed oil phthalic acid | — | — | 39 |

TABLE 2-continued

| | Zinc Dust Paint (1) | Zinc Dust Paint (2) | Zinc Chromate Paint |
|---|---|---|---|
| resin varnish | | | |
| Mineral spirit | — | 2 | 7 |
| Xylene | — | 8 | — |
| Aluminum stearate | — | 0.5 | 1 |
| Ultrafine granular silica | — | 0.5 | 1 |
| Pigment (titanium oxide) | — | — | 17 |
| Total | 100 | 100 | 100 |

Preparation of Test Pieces for Evaluation Tests

On surfaces of various steel plates shown in Tables 3 and 4, undercoat layers were formed by plating or coating, and surfaces of the undercoat layers were coated with the paint compositions shown in Table 1, followed by hardening treatment to prepare test piece Nos. 1 to 16 (examples) and test piece Nos. 17 to 23 (comparative examples) for evaluation tests. The steel plates used as substrates were subjected to the alkali treatment as a preliminary treatment before coating of the paint compositions. An air spray gun was used for coating of the paint compositions, and an electric oven was used for heating. The coating and hardening conditions of the coating compositions are shown in Tables 3 and 4. The size of all the test pieces was 150 mm×70 mm.

Rust Prevention Test (Salt Water Resistance Spray Test)

Cross cuts were made on the whole surface of one side of each of the test pieces shown in Tables 3 and 4 so that the texture of iron was exposed (cuts were made on diagonal lines of each test piece forming X-shape). Based on JIS K-5400-9.1, a 5% salt water was continuously sprayed to each test piece for a specified period of time, and the appearance of each coat was observed. Results thereof are shown in Table 5.

In Table 5, a test piece in which no development of rust was observed was indicated as "○", one in which development of rust was observed on end faces or cross cut portions was indicated as "Δ", and one in which development of rust was also observed on other portions in addition to end faces and cross cut portions was indicated as "X". "-" indicates that a test piece was not evaluated.

TABLE 5

| Test Piece No. | After Elapse of 840 Hrs | After Elapse of 1,500 Hrs | After Elapse of 2,400 Hrs | Note |
|---|---|---|---|---|
| 1 | ○ | ○ | ○ | Example |
| 2 | ○ | ○ | ○ | Example |
| 3 | ○ | ○ | ○ | Example |
| 4 | ○ | ○ | ○ | Example |
| 5 | ○ | ○ | Δ | Example |

TABLE 3

| Test Piece No. | Thickness of Steel Plate (mm) | Undercoat Coating Method (Thickness:μm) | Overcoat Composition | Overcoat Thickness (μm) | Overcoat Drying Method | Note |
|---|---|---|---|---|---|---|
| 1 | 1.5 | Zinc hot dipping* | A | 75 | Ordinary temp. | Example |
| 2 | 2.0 | Zinc hot dipping* | B | 90 | Ordinary temp. | Example |
| 3 | 1.5 | Zinc hot dipping* | D | 30 | Ordinary temp. | Example |
| 4 | 1.5 | Zinc hot dipping* | E | 50 | 120° C., 5 min. | Example |
| 5 | 2.0 | Zinc hot dipping* | G | 40 | Ordinary temp. | Example |
| 6 | 0.3 | Zinc electroplating* | A | 30 | Ordinary temp. | Example |
| 7 | 0.3 | Zinc electroplating* | D | 25 | 100° C., 10 min. | Example |
| 8 | 0.3 | Tin electroplating* | B | 30 | Ordinary temp. | Example |
| 9 | 0.3 | Tin electroplating* | F | 35 | Ordinary temp. | Example |
| 10 | 0.3 | Zinc dust paint (1) (20) | B | 30 | 180° C., 3 min. | Example |
| 11 | 2.0 | Zinc dust paint (1) (40) | C | 35 | Ordinary temp. | Example |
| 12 | 2.0 | Zinc dust paint (1) (30) | D | 35 | 120° C., 5 min. | Example |
| 13 | 2.0 | Zinc dust paint (1) (40) | E | 40 | Ordinary temp. | Example |
| 14 | 2.0 | Zinc dust paint (2) (40) | F | 50 | 150° C., 5 min. | Example |
| 15 | 1.5 | Zinc chromate paint (50) | A | 55 | Ordinary temp. | Example |
| 16 | 1.5 | Zinc chromate paint (40) | G | 40 | Ordinary temp. | Example |

*Each of the undercoated steel plates of test pieces No. 1 to 9 is a commertially available product.

TABLE 4

| Test Piece No. | Thickness of Steel Plate (mm) | Undercoat Coating Method (Thickness:μm) | Overcoat Composition | Overcoat Thickness (μm) | Overcoat Drying Method | Note |
|---|---|---|---|---|---|---|
| 17 | 1.5 | Zinc hot dipping* | Chlorinated rubber | 90 | Ordinary temp. | Com. Ex. |
| 18 | 1.5 | Zinc hot dipping* | Acrylic resin | 120 | 180° C., 30 min. | Com. Ex. |
| 19 | 0.3 | Zinc electroplating* | Epoxy resin | 60 | Ordinary temp. | Com. Ex. |
| 20 | 0.3 | Tin electroplating* | Chlorinated rubber | 55 | Ordinary temp. | Com. Ex. |
| 21 | 2.0 | Zinc dust paint (1) (40) | Epoxy/amino resin | 140 | 150° C., 30 min. | Com. Ex. |
| 22 | 2.0 | Zinc dust paint (2) (40) | Acrylic resin | 120 | 180° C., 30 min. | Com. Ex. |
| 23 | 1.5 | Zinc chromate paint (40) | Chlorinated rubber | 110 | Ordinary temp. | Com. Ex. |

*Each of the undercoated steel plates of test pieces No. 17 to 20 is a commertially available product.

TABLE 5-continued

| Test Piece No. | After Elapse of 840 Hrs | After Elapse of 1,500 Hrs | After Elapse of 2,400 Hrs | Note |
|---|---|---|---|---|
| 6 | ○ | ○ | ○ | Example |
| 7 | ○ | ○ | ○ | Example |
| 8 | ○ | ○ | Δ | Example |
| 9 | ○ | ○ | Δ | Example |
| 10 | ○ | ○ | ○ | Example |
| 11 | ○ | ○ | ○ | Example |
| 12 | ○ | ○ | ○ | Example |
| 13 | ○ | ○ | ○ | Example |
| 14 | ○ | ○ | ○ | Example |
| 15 | ○ | ○ | ○ | Example |
| 16 | ○ | ○ | X | Example |
| 17 | Δ | — | — | Com. Example |
| 18 | ○ | Δ | — | Com. Example |
| 19 | Δ | — | — | Com. Example |
| 20 | Δ | — | — | Com. Example |
| 21 | Δ | — | — | Com. Example |
| 22 | Δ | — | — | Com. Example |
| 23 | Δ | — | — | Com. Example |

Physical Property Tests

The above-mentioned test piece Nos. 1 to 16 (examples) were stored in a room for 7 days, and then, tested for the following physical properties. Results thereof are shown in Table 6.

Adhesion;

The test was made based on the cross-cut adhesion test of JIS K-5400-8. 5. 1.

Hardness;

The test was made based on the pencil scratch test of JIS K-5400-8. 4. 2.

Impact Resistance;

The test was made based on JIS K-5400-8. 3. 1 (25.4 mm, 300 g×20 cm).

Hot Water Resistance;

A test piece was stored in hot water at 60° C. for 14 days, and then, the appearance of a coat was observed.

Weather Resistance;

Using a sunshine carbon arc type weather meter based on JIS K-5400-9. 8. 1, a test piece was exposed for 3,000 hours, and then, the appearance of a coat was observed.

Results of the evaluation of the appearance of the coat were indicated according to the following below:

○; No separation of the coat was observed, and no changes in appearance were observed.

X; Separation, cracks, fusion, stains or discoloration served in a part or the whole of the coat.

-: Not evaluated.

Results of the above-mentioned evaluation tests are shown in Table 6.

TABLE 6

| Test Piece No. | Adhesion | Hardness | Impact Resistance | Hot Water Resistance | Weather Resistance | Note |
|---|---|---|---|---|---|---|
| 1 | ○ | 5H | ○ | ○ | ○ | Example |
| 2 | ○ | 6H | ○ | ○ | ○ | Example |
| 3 | ○ | 6H | ○ | ○ | ○ | Example |
| 4 | ○ | 3H | ○ | ○ | ○ | Example |
| 5 | ○ | H | ○ | X | X | Example |
| 6 | ○ | 5H | ○ | ○ | ○ | Example |
| 7 | ○ | 5H | ○ | ○ | ○ | Example |
| 8 | ○ | 6H | ○ | ○ | ○ | Example |
| 9 | ○ | 6H | ○ | ○ | ○ | Example |
| 10 | ○ | 7H | ○ | ○ | ○ | Example |
| 11 | ○ | 5H | ○ | ○ | ○ | Example |
| 12 | ○ | 6H | ○ | ○ | ○ | Example |
| 13 | ○ | 3H | ○ | ○ | ○ | Example |
| 14 | ○ | 5H | ○ | ○ | ○ | Example |
| 15 | ○ | 5H | ○ | ○ | ○ | Example |
| 16 | ○ | H | ○ | X | X | Example |

Salt Water Spray Test after Weather Resistance Test

Using test piece Nos. 1 to 4 and 6 to 15 in which the weather resistance test had been terminated, the salt water resistance spray test was conducted for 1,200 hours in the same manner as described above. Results thereof are shown in Table 7. A test piece in which no development of rust was indicated as "○".

TABLE 7

| Test Piece No. | Salt Water Resistance Spray Test (After Elapse of 1,200 Hours) | Note |
|---|---|---|
| 1 | ○ | Example |
| 2 | ○ | Example |
| 3 | ○ | Example |
| 4 | ○ | Example |
| 6 | ○ | Example |
| 7 | ○ | Example |
| 8 | ○ | Example |
| 9 | ○ | Example |
| 10 | ○ | Example |
| 11 | ○ | Example |
| 12 | ○ | Example |
| 13 | ○ | Example |
| 14 | ○ | Example |
| 15 | ○ | Example |

What is claimed is:

1. A rust preventive coating formed on a surface of a substrate comprising iron, which comprises an undercoat layer of the following (1) and an overcoat layer of the following (2):

(1) the undercoat layer obtained by coating the substrate with zinc by hot dipping, electroplating, penetration plating, thermal spraying or chemical plating, or a paint containing zinc dust; and (2) the overcoat layer obtained by coating the undercoat layer with a paint composition comprising (a) 100 parts by weight of an inorganic filler, (b) 5 to 30 parts by weight of a binder comprising a member selected from the group consisting at least one amine silicate and a mixture of at least one amine selected and at least one synthetic resin in terms of solid content, and (c) one member selected from the group consisting of 10 to 100 parts by weight of water and/or a hydrophilic organic solvent, and then, hardening said composition.

2. The rust preventive coating according to claim 1, in which said inorganic filler (a) has an average particle size or an average length of 0.02 to 50 $\mu$m, is water-insoluble, and comprises at least one member selected from the group consisting of inorganic extenders, functional pigments, inorganic pigments and metal powders.

3. The rust preventive coating according to claim 1, in which said undercoat layer has a dried film thickness of 5 to 400 $\mu$m.

4. The rust preventive coating according to claim 1 wherein said overcoat layer has a dried film thickness of 5 to 400 $\mu$m.

5. The rust preventative coating according to claim 2 wherein said binder (b) comprises at least one member consisted from the group consisting of silicates, colloidal silica, colloidal alumina and synthetic resins.

6. The rust preventative coating according to claim 2 wherein said overcoat layer has a dried film thickness of 5 to 400 μm.

7. The rust preventative coating according to claim 3 wherein said overcoat layer has a dried film thickness of 5 to 400 μm.

8. The rust preventative coating according to claim 3 wherein said overcoat layer has a dried film thickness of 5 to 400 μm.

* * * * *